United States Patent [19]

Steeg

[11] 4,368,812

[45] Jan. 18, 1983

[54] CLUTCH PLATE

[75] Inventor: Klaus Steeg, Bühl, Fed. Rep. of Germany

[73] Assignee: Luk Lamellen und Kupplungsbau GmbH, Bühl, Fed. Rep. of Germany

[21] Appl. No.: 181,160

[22] Filed: Aug. 22, 1980

[30] Foreign Application Priority Data

Aug. 23, 1979 [DE] Fed. Rep. of Germany ....... 2934135
Jun. 13, 1980 [DE] Fed. Rep. of Germany ....... 3922212

[51] Int. Cl.$^3$ .............................................. F16D 3/14
[52] U.S. Cl. .................................... 192/106.2; 464/68
[58] Field of Search ............... 192/106.2, 106.1, 89 B, 192/70.17, 70.16; 64/27 S, 27 F

[56] References Cited

U.S. PATENT DOCUMENTS 2,706,491 4/1955 Kohler ............... 192/89 B
4,274,525 6/1981 Raab et al. ........ 192/106.2

FOREIGN PATENT DOCUMENTS 2127836 12/1972 Fed. Rep. of Germany ... 192/106.1
2714861 10/1978 Fed. Rep. of Germany .... 192/89 B
1174692 12/1969 United Kingdom .

Primary Examiner—George H. Krizmanich
Attorney, Agent, or Firm—Kontler, Grimes & Battersby

[57] ABSTRACT

A clutch plate for use in the friction clutch of an automotive vehicle has a driving unit with two spaced apart discs which are riveted to each other and one of which carries friction linings adapted to be driven by the flywheel when the clutch is engaged, and a driven unit which is connected to the driving unit by prestressed springs so that the driving unit can turn relative to the driven unit within a given range. The driven unit has a hub which drives the input shaft of the transmission and carries a flange between the two discs. An elastic washer is inserted in prestressed condition between the flange and one of the discs to damp the movements of the two units relative to each other, at least within a portion of the aforementioned range. The washer has radially outwardly or inwardly extending arms whose wedge-like tips are received in the openings of the one disc, radially outwardly or inwardly extending projections in frictional engagement with the one disc, and a ring-shaped bead whose convex surface is in frictional engagement with the flange of the hub.

30 Claims, 6 Drawing Figures

Fig.1
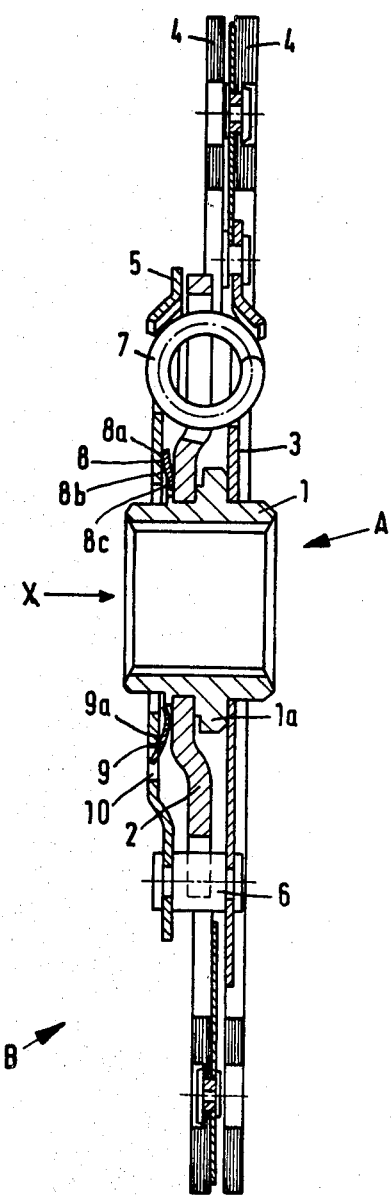
Fig.2a
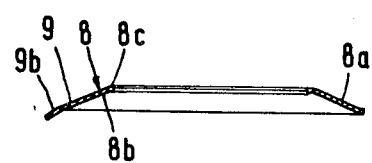
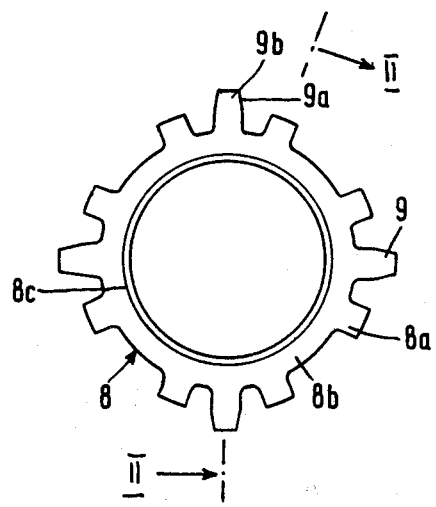
Fig.2

CLUTCH PLATE

BACKGROUND OF THE INVENTION

The present invention relates to clutches in general, and more particularly to improvements in clutch plates (also called driven discs) which form part of friction clutches and serve to transmit torque from a rotary driving member (e.g., the flywheel which receives torque from the crankshaft of the engine in an automotive vehicle) to a rotary driven member (such as the splined input shaft of the transmission in an automotive vehicle). Still more particularly, the invention relates to improvements in clutch plates of the type wherein a driving unit (including the part or parts which receive torque from the rotary driving member) transmits rotary motion to a driven unit (including the part or parts which transmit torque to the rotary driven member) by way of one or more helical springs or other suitable energy-storing torque transmitting devices. As a rule, the driving unit includes one or more friction linings or discs which are engaged by the customary pressure plate and/or flywheel when the clutch transmits torque, and the driven unit includes a hub which is movable axially of but cannot rotate with respect to the rotary driven member. The torque transmitting device or devices can undergo a certain amount of deformation when the driving unit tends to rotate relative to the driven unit and thereupon ensure that the driven unit shares the angular movements of the driving unit.

It is also known to provide a clutch plate of the above outlined character with a means (hereinafter called damping device or insert) which is disposed between the driving and driven units and serves to perform a damping action during that stage of angular movement of the driving unit when the latter rotates relative to the driven unit against the opposition of the yieldable torque transmitting means or while the torque transmitting means dissipates energy to change the angular positions of the two units with respect to each other. The damping device is of annular shape and exhibits at least some elasticity, as considered in the axial direction of the clutch plate.

A clutch plate with yieldable torque transmitting means and a damping device is disclosed in British Pat. No. 1,174,692. The hub of the driven unit of the patented clutch plate has a flange which is disposed between two annular components of the driving unit, namely, a disc-shaped carrier member for one or more friction linings at one side and a disc at the other side of the flange. The carrier member is connected with the disc by several rivets. The rivets ensure that the carrier member and the disc rotate as a (driving) unit which is coupled to the driven unit (including the hub and its flange) by the aforementioned torque transmitting devices in the form of prestressed helical springs or the like. When the flywheel rotates the driving unit relative to the driven unit, the springs store additional energy before the driven unit begins to share all angular movements of the driving unit. Friction generating washers are installed between the sides of the flange of the hub on the one hand and the carrier member and disc of the driving unit on the other hand. These washers perform a damping action when the driving unit turns relative to the driven unit and/or vice versa. Friction is generated owing to the provision of a dished spring which reacts against the aforementioned disc of the driving unit and bears against the washer which is interposed between the disc and the flange. The dished spring rotates with the disc of the driving unit; to this end, the dished spring has radially outwardly extending arms, the radially outermost portions of which are bent to positions of substantial parallelism with the axis of the hub and extend into openings provided therefor in the disc of the driving unit.

A drawback of the damping device in the clutch plate of the aforementioned British Pat. No. 1,174,672 is that it comprises several discrete parts, namely, the washers and the dished spring. This contributes to initial cost of the clutch, and the assembly of such discrete parts with the driving and driven units of the clutch plate takes up a substantial amount of time. Moreover, the combined thickness of the components of such damping means (as considered in the axial direction of the clutch plate) is quite pronounced so that a clutch plate embodying the just described conventional composite damping device cannot be used in all types of friction clutches. More specifically, many types of clutch plates do not provide enough room between the carrier member and the disc of the driving unit to allow for introduction of the flange (of the driven unit), one or more friction generating washers as well as a dished spring.

OBJECTS AND SUMMARY OF THE INVENTION

An object of the invention is to provide a novel and improved clutch plate which is constructed and assembled in such a way that its dimensions (as considered in the axial direction) need not be increased at all or are increased only negligibly as a result of the installation of a damping device between the driving and driven units of the clutch plate.

Another object of the invention is to provide a novel and improved damping device for use in a clutch plate of the type wherein the parts of the driving unit which receives rotary motion from the rotary driving member of the clutch can turn, within limits, relative to the parts of the driven unit which is rotated by the driving unit and rotates the rotary driven member of the clutch.

A further object of the invention is to provide a clutch plate which is not only simpler, but also less expensive and more compact than heretofore known clutch plates with energy-storing torque transmitting means between the driving and driven units.

An additional object of the invention is to provide a novel clutch plate whose useful life at least matches the useful life of conventional clutch plates, which can be readily installed in many types of friction clutches as a superior and less-expensive substitute for heretofore known clutch plates, and wherein the space requirements of the damping device (as considered in the axial direction) are a small fraction of space requirements of heretofore known damping devices.

A further object of the invention is to provide a novel and improved one-piece damping device between the relatively movable units of a friction clutch for use in automotive vehicles or the like.

The invention is embodied in a clutch, particularly in a friction clutch for use in automotive vehicles, and more particularly in a rotary clutch plate which serves to transmit torque between a rotary driving member (e.g., a flywheel) and a rotary driven member (e.g., a shaft) of the friction clutch. The clutch plate comprises coaxial driving and driven units which are rotatable with respect to each other within a given range (e.g., through a relatively small acute angle), elastically deformable torque transmitting means (such as prestressed coil springs) interposed between the two units to rotate the driven unit in response to rotation of the driving unit after undergoing deformation which is commensurate with the resistance of the driven unit to rotation with the driving unit, and a deformable damping device (e.g., a simple one-piece resiliently deformable washer) which is directly coupled to one of the units (e.g., to a disc of the driving unit) and is in direct frictional engagement with the other unit to yieldably oppose rotation of the two units with reference to each other, at least within a portion of the aforementioned range. For example, the other unit may comprise a hub having a flange which is in contact with the damping device. The latter is preferably an annulus which surrounds the hub of the other unit.

The damping device preferably comprises a first portion and a second portion which is located radially inwardly of the first portion. One of these portions is coupled to the one unit (e.g., by being provided with one or more arms extending into openings in a disc of the driving unit), and the other portion of the damping device is in frictional engagement with the other unit, e.g., with the flange of the hub forming part of the driven unit. The other portion of the damping device is preferably a ring having a circumferentially complete convex surface with a radius of curvature in the range of 1-3 mm (preferably approximately 2 mm) which contacts the flange. The damping device is (or can be) further provided with an annulus of projections which bear against the one unit, i.e., against the unit which is coupled and invariably rotates with the damping device. The projections can be shorter than or as long as the aforementioned arm or arms, and each arm can be flanked by two projections.

The novel features which are considered as characteristic of the invention are set forth in particular in the appended claims. The improved clutch plate itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a clutch plate with a damping device which embodies one form of the invention;

FIG. 2 is a side elevational view of the damping device as seen in the direction of arrow X in FIG. 1;

FIG. 2a is a sectional view as seen in the direction of arrows from the line II—II of FIG. 2;

DESCRIPTION OF THE PREFERRED EMBODIMENTS

Figure 3:
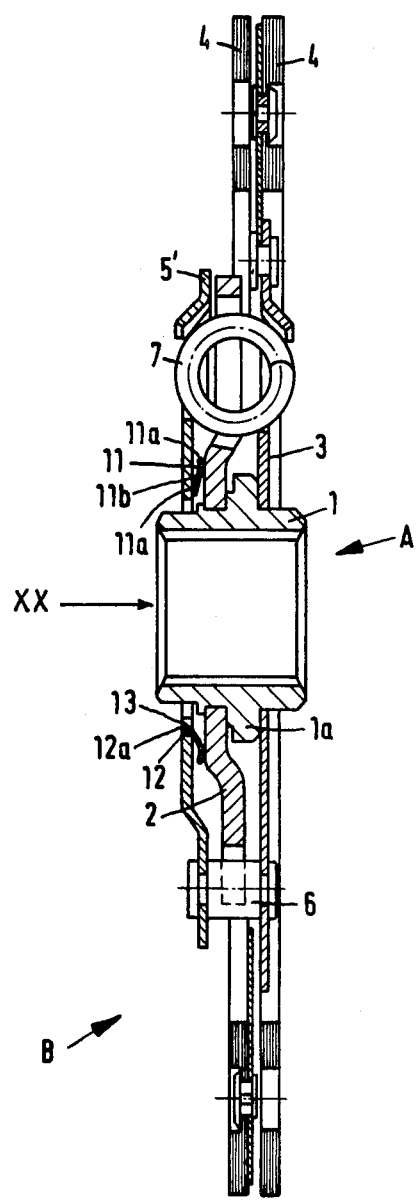
FIG. 3 is an axial sectional view of a clutch plate which embodies a modified damping device.

Referring first to FIG. 1, there is shown a clutch plate which includes a hub 1 adapted to be mounted on and to transmit torque to the splined portion of the input shaft of the transmission in an automotive vehicle. The hub 1 is movable axially of the input shaft and is provided with a radially outwardly extending flange 2. The clutch plate further comprises a disc-shaped carrier member or disc 3 for friction discs or linings 4. The carrier member 3 surrounds the hub 1 and is disposed at one side of the flange 2. A second disc-shaped member or disc 5 surrounds the hub 1 at the other side of the flange 2 and is fixedly connected to the carrier member 3 by several rivets 6 or other suitable fasteners (only one shown in FIG. 1).

The carrier member 3 and the disc 5 always rotate as a (driving) unit (B) owing to the provision of rivets 6, and they have limited freedom of angular movement relative to the hub 1 against the opposition of yieldable energy storing and torque transmitting springs 7 which are interposed between the discs 3, 5 on the one hand and the flange 2 of the hub 1 on the other hand.

The clutch plate of FIG. 1 further comprises a novel device for damping the relative movements between the hub 1 and the discs 3, 5, namely, for damping angular movements of the carrier member 3 relative to a radially outwardly extending collar or flange 1a of the hub 1, and for damping angular movements of the disc 5 relative to the flange 2. The radially innermost portion of the carrier member 3 is in direct frictional engagement with the respective side of the collar 1a, and the damping device for frictionally engaging the flange 2 comprises a washer-like resiliently deformable annular insert 8 which is constructed and installed in such a way that it shares all angular movements of the disc 5. The insert 8 is installed in the space between the innermost portion of the disc 5 and the corresponding side of the flange 2 on the hub 1. This insert is installed in prestressed condition, as considered in the axial direction of the hub 1. It can be said that the washer-like insert 8 constitutes a yieldable link between the driving unit B which includes the carrier member 3 and the disc 5, and a driven unit A which includes the hub 1 and the flange 2.

The insert 8 comprises an annulus of radially outwardly extending resilient projections or fingers 8a which bear against the adjacent portion of the disc 5, and a ring-shaped radially innermost portion 8c which is in frictional engagement with the flange 2. The portion 8c resembles or constitutes a circumferentially complete bead which is rounded and has a convex surface with a radius of curvature in the range between 1 and 3 millimeters, preferably about 2 mm. The reference character 8b denotes the median or main portion of the insert 8, namely, that portion whose outermost part is integral with the projections 8a and whose innermost part is integral or constitutes the ring-shaped portion 8c.

The insert 8 further comprises an outermost portion consisting of relatively long radially outwardly extending equidistant projections or arms 9 each of which is flanked by and is disposed midway between two neighboring projections 8a which are shorter than the arms 9. The outer portions 9b of the arms 9 are bent (see also FIG. 2a) so as to extend into complementary openings or sockets 10 of the disc 5. The portions 9b are flanked by pairs of radially outwardly converging surfaces 9a so that they resemble flat wedges which fit into the respective openings 10 and engage the adjacent pair of surfaces (not referenced) surrounding such openings. The more pronounced bending of the outermost portions 9b of the arms 9 than the bending of projections 8a with reference to a plane which is normal to the axis of the insert 8 ensures that the surfaces 9b are more likely to come in contact with the adjacent pair of surfaces in the corresponding openings 10 of the disc 5. The extent to which the portions 9b are bent relative to the remaining (inner) portions of the respective arms 9 and with respect to the projections 8a (in unstressed condition of the insert 8) is shown in FIG. 2a; the inclination of portions 9b relative to the remaining portions of the arms 9 is normally in the range of 20 degrees.

FIG. 2 shows that the insert 8 has four equidistant arms 9, and that each of these arms is disposed midway between two projections 8a. Thus, the number of projections 8a is twice that of the arms 9, and two projections 8a are disposed between each pair of neighboring arms 9, as considered in the circumferential direction of the hub 1. As explained above, the projections 8a frictionally engage the disc 5 whereas the arms 9 form the male elements of a positive torque transmitting coupling between the disc 5 and insert 8. The disc 5 receives torque, in a well known manner, from the flywheel of the engine of the automotive vehicle by way of the carrier member 3 and rivets 6 when one of the linings 4 is urged against the flywheel while the other lining 4 is engaged by the pressure plate under the action of a dished (Belleville) spring when the clutch is engaged. Reference may be had to U.S. Pat. No. 2,211,192 granted Aug. 13, 1940 to W. S. Wolfram.

It will be noted that at least some of the neighboring projections 8a are equidistant from each other, as considered in the circumferential direction of the hub 1. For example, the angular distance between the projections 8a intermediate two neighboring arms 9 is always the same.

Figure 4A:
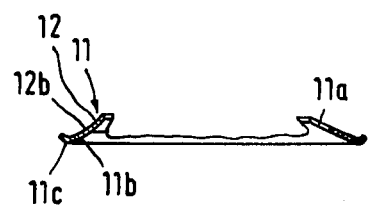
FIG. 4a is a sectional view as seen in the direction of arrows from the line IV—IV of FIG. 4.
Figure 4:
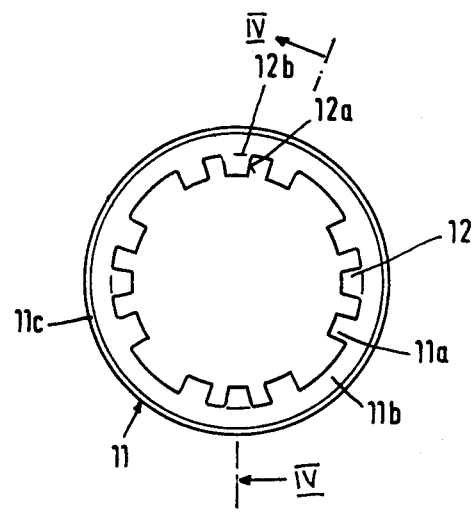
FIG. 4 is a side elevational view of the modified damping device as seen in the direction of arrow XX in FIG. 3.

FIG. 3 illustrates a modified clutch plate wherein all such parts which are identical with or clearly analogous to those of the clutch plate of FIG. 1 are denoted by similar reference characters. The difference between the two clutch plates is that the disc 5' of FIG. 3 has a differently positioned set of openings or sockets 13 for the arms 12 of a modified annular damping device or insert 11 which is shown in FIGS. 4 and 4a. The insert 11 consists of resilient material, e.g., sheet steel, and its projections 11a and arms 12 are of equal length and extend radially inwardly. The circumferentially complete friction generating portion or bead 11c is located radially outwardly of the main portion 11b of this insert. The projections 11a of the insert 11 bear against the disc 5' and the convex surface of the bead 11c is in frictional engagement with the flange 2 of the hub 1. FIG. 4a shows that the arms 12 are bent with respect to the projections 11a so as to enter the adjacent openings 13 in the disc 5'. FIG. 4 shows that the arms 12 resemble flat wedges 12b whose convergent surfaces 12a engage the adjacent surfaces in the corresponding openings 13 in the same way as described in connection with the surfaces 9a of the arms 9 shown in FIGS. 1, 2 and 2a. The inclination of the arms 12 with reference to the adjacent projections 11a is approximately 20 degrees. Each arm 12 is flanked by and is located midway between two projections 11a. There are four equidistant arms 12 and eight projections 11a.

Certain important advantages of the clutch plate which embodies the improved insert 8 or 11 are its simplicity, reliability, low cost and convenience of assembly or dismantling. This is due to the fact that the annular washer-like insert is directly coupled to one (B) of the driving and driven units and is in direct frictional engagement with the other unit (A). Since the insert 8 or 11 is installed in prestressed condition, as considered in the axial direction of the clutch plate, it invariably bears against the flange 2 to damp at least some angular movements of the driving unit B relative to the driven unit A and/or vice versa, i.e., at least some of the angular movements which are possible owing to the provision of yieldable energy-storing torque transmitting means 7.

The friction linings which constitute indispensable parts of conventional damping devices can be omitted. This reduces the cost and simplifies the assembly of the clutch plate embodying the damping device 8 or 11.

The improved damping device is susceptible of many additional modifications without departing from the spirit of the invention. For example, the projections 11a of the device 11 can extend radially outwardly beyond the bead 11c, and the projections 8a of the device 8 can extend radially inwardly beyond the bead 8c. Furthermore, the band 8c or 11c can be provided centrally of the median portion 8b or 11b of the corresponding damping device.

The stressing of the arms 9 or 12 can exceed the stressing of the projections 8a or 11a in inserted condition of the damping device 8 or 11. The wedging of arms 9 or 12 into the adjacent openings 10 or 13 prevents the development of any play between the damping device 8 or 11 and the disc 5 or 5', as considered in the circumferential direction of the hub 1. The circumferentially complete bead 8c or 11c ensures that the frictional engagement between the damping device 8 or 11 and the flange 2 is uniform all the way around the hub 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in friction clutches of automotive vehicles, comprising coaxial driving and driven units which are rotatable relative to each other within a given range; resiliently deformable torque transmitting means interposed between said units; and a deformable damping device which is directly coupled to one of said units and is in direct frictional engagement with the other of said units to frictionally oppose rotation of said units relative to each other, at least within a portion of said range.

2. The clutch plate of claim 1, wherein said driving unit comprises at least one friction lining disposed radially outwardly of said damping device and said driven unit comprises a hub.

3. The clutch plate of claim 1, wherein said damping device is resiliently deformable and is disposed between said units in prestressed condition, as considered in the axial direction of the clutch plate, to bear directly against said other unit.

4. The clutch plate of claim 1, wherein said damping device is an annulus.

5. The clutch plate of claim 4, wherein said driven unit includes a hub and said damping device surrounds said hub.

6. The clutch plate of claim 5, wherein said damping device includes a first portion and a second portion located radially inwardly of said first portion, one of said portions being non-rotatably coupled to said one unit and the other of said portions being in direct frictional engagement with said other unit.

7. The clutch plate of claim 6, wherein said other portion of said damping device is ring-shaped.

8. The clutch plate of claim 7, wherein said ring-shaped portion has a convex annular outer surface which is in frictional engagement with the other unit.

9. The clutch plate of claim 8, wherein the radius of curvature of said convex surface is between 1 and 3 mm.

10. The clutch plate of claim 8, wherein the radius of curvature of said convex surface is approximately 2 mm.

11. A clutch plate, particularly for use in friction clutches of automotive vehicles, comprising coaxial driving and driven units which are rotatable relative to each other within a given range; resiliently deformable torque transmitting means interposed between said units; and a deformable damping device which is directly coupled to one of said units and is in direct frictional engagement with the other of said units to frictionally oppose rotation of said units relative to each other, at least within a portion of said range, said damping device including a first portion, a second portion located radially inwardly of said first portion and at least one projection in engagement with said one unit, one of said portions being non-rotatably coupled to said one unit and the other of said portions being in direct frictional engagement with said other unit, said one portion including at least one substantially radially disposed coupling arm and said one unit having an opening for such arm.

12. The clutch plate of claim 11, wherein said projection is resilient.

13. The clutch plate of claim 11, wherein said one portion of said damping device comprises a plurality of arms which are equidistant from each other, as considered in the circumferential direction of said hub.

14. The clutch plate of claim 11, wherein said damping device comprises a plurality of neighboring projections and at least some of said projections are equidistant from each other, as considered in the circumferential direction of said hub.

15. The clutch plate of claim 14, wherein said one portion of said damping device comprises a plurality of radially extending coupling arms, the number of said projections exceeding the number of said arms.

16. The clutch plate of claim 15, wherein the number of said projections is twice the number of said arms.

17. The clutch plate of claim 15, wherein each of said arms is disposed between two projections of said damping device.

18. The clutch plate of claim 15, wherein two projections are disposed between each pair of neighboring arms, as considered in the circumferential direction of said hub.

19. The clutch plate of claim 11, wherein said projection is shorter than said arm, as considered in the radial direction of said damping device.

20. The clutch plate of claim 11, wherein said one unit in said driving unit.

21. The clutch plate of claim 20, wherein said driving unit comprises a disc and said opening is provided in said disc, said projection being in frictional engagement with said disc.

22. The clutch plate of claim 20, wherein said driven unit comprises a portion which rotates with said hub and said other portion of said damping device is in frictional engagement with said portion of said driven unit.

23. The clutch plate of claim 22, wherein said portion of said driven unit is a flange extending radially outwardly from said hub.

24. The clutch plate of claim 23, wherein said driving unit comprises two spaced-apart coaxial discs and said flange is disposed between said discs, said damping device being disposed between said flange and one of said discs.

25. The clutch plate of claim 11, wherein said arm is wedged into said opening.

26. The clutch plate of claim 25, wherein said arm has a first pair of spaced-apart surfaces and said one unit has a second pair of spaced-apart surfaces disposed in said opening and engaging the surfaces of said first pair, the surfaces of at least one of said pairs being inclined with respect to each other.

27. The clutch plate of claim 11, wherein said arm is located radially outwardly of said other portion of the damping device.

28. The clutch plate of claim 11, wherein said arm is located radially inwardly of said other portion of said damping device.

29. The clutch plate of claim 11, wherein the length of said arm equals or approximates the length of said projection, as considered in the radial direction of said damping device.

30. The clutch plate of claim 11, wherein said projection and said arm are inclined with reference to a plane which is normal to the axis of said damping device and the inclination of said arm with respect to such plane exceeds the inclination of said projection.

* * * * *